April 21, 1931.  G. W. BLAIR  1,801,324
QUICK OPERATING FASTENER
Filed April 16, 1925
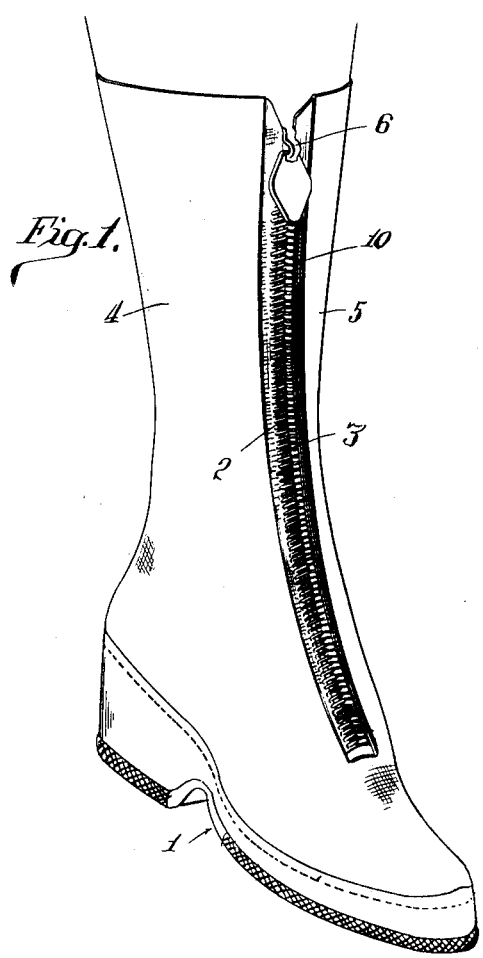
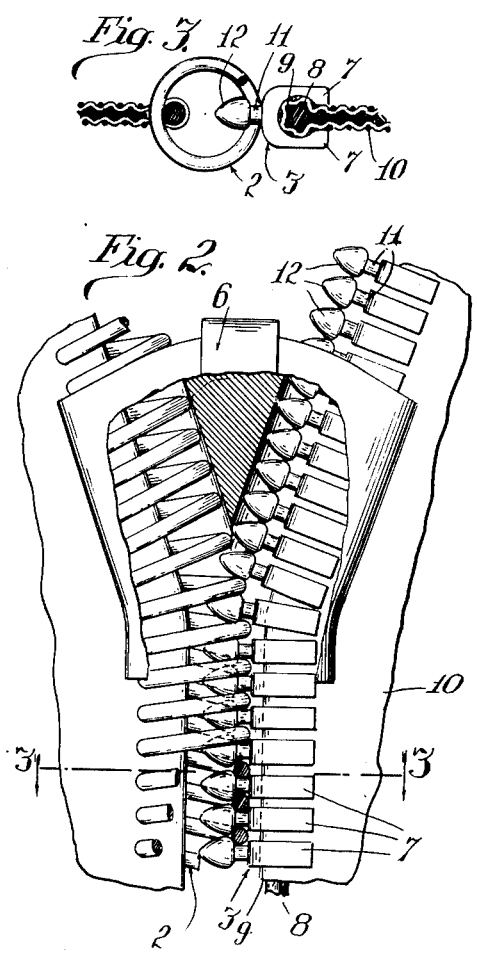
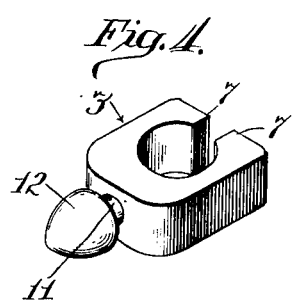
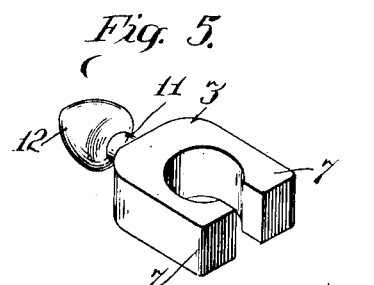
Inventor
George W. Blair
By Eugene M. Giles
Attorney Patented Apr. 21, 1931

1,801,324

UNITED STATES PATENT OFFICE

GEORGE W. BLAIR, OF MISHAWAKA, INDIANA, ASSIGNOR TO MISHAWAKA RUBBER & WOOLEN MANUFACTURING COMPANY, OF MISHAWAKA, INDIANA, A CORPORATION OF INDIANA

QUICK-OPERATING FASTENER

Application filed April 16, 1925. Serial No. 23,472.

My invention has reference to fastening devices wherein a series of closely arranged fastener elements is provided on each of the parts, which are to be connected, and said fastener elements are adapted to be interlocked and released by movement of an operating member therealong.

In fasteners of the above mentioned type it is not only important that the fastener elements must interlock and release rapidly and smoothly, and remain interlocked under strains which tend to pull them apart, but inasmuch as such fasteners are frequently used in connection with articles, for example, shoes and other foot wear, in which considerable lateral bending of the fastener takes place, it is important that the interengaged fastener elements should be so constructed that the fastener bends easily without cramping and so that the elements will not slip out of engagement sidewise, when such lateral bending takes place.

The principal objects of my invention are to provide an improved fastener of the above mentioned type; to construct the elements so that they engage and disengage smoothly and rapidly upon movement of the operating member therealong; to insure ample flexibility; to avoid cramping action between adjoining elements when the fastener is bent laterally; to prevent the fastener elements slipping out of engagement sidewise when the fastener is bent laterally; to construct the fastener so that there is a narrow point of contact between the interlocked elements, and a sort of rocking action afforded to permit easy lateral bending of the fastener without strain on the adjoining elements; and in general to simplify and improve a fastening device of the type above referred to.

On the drawings, Figure 1 is a perspective view of an overshoe embodying my invention.

Figure 2 is an enlarged front view of the fastener with the operating member broken away to disclose the elements at the point of interlocking and releasing.

Figure 3 is a sectional view on the line 3—3 of Figure 2, and

Figures 4 and 5 are perspective views of the headed fastener elements.

In the accompanying drawing I have shown my fastener as applied to an overshoe of the type commonly worn by women although it is to be understood that the present fastener is capable of, and intended for use in connection with other types of foot wear or with any other articles wherein a quick operating fastening device is desired. Referring to the drawings the reference numeral 1 indicates an overshoe, as a whole, which is divided down the front and has opposed series of female and male fastener elements 2 and 3 respectively along the forward edges of the overshoe quarters 4 and 5 which are adapted to be interlocked and released by movement of a slider 6 therealong.

The fastener elements 2, are spaced convolutions of an elongated coiled member which may be attached to the edge of the quarter 4 in any convenient manner, for example as shown in the application of myself and August H. De Groote, filed December 22, 1924, Serial No. 757,320. The fastener elements 3 may be secured to the quarter 5 in any convenient manner as for example, by forming said elements with jaws 7 which are clamped around a cord 8 and the enclosing fold 9 of a tape 10 which latter is attached to the edge of the quarter 5. The particular manner of mounting the members 2 and 3 along the seam, however, does not form a part of my present invention and any suitable mounting thereof may be employed.

Each of the members 3 is formed at the end remote from the jaws 7 with a short neck 11 terminating in a ball or head 12 which is preferably circular in cross section and elongated as shown in Figure 2 and terminates in a sort of a rounded point, the upper and lower surface portions of the ball or head 12 between said point and the neck 11, being bulged or arched respectively upwardly and downwardly, to guide the headed members between the convolutions 2 of the coiled fastener member. The convolutions or elements 2 are also preferably made of round wire and their outer end portions, therefore, which extend transversely between the necks 11 of adjoining elements 3, have the upper and lower surfaces thereof substantially half round or arched respectively upwardly and downwardly to guide the balls or heads 12 of elements 3 readily between the coil elements 2. The neck portions 11 are of suitable length so as to admit the wire of the coils 2 between the heads 12 and the ends of the elements 3, said coils being normally held between the neck portions of the adjoining element 3 by reason of the enlarged heads 12, and said heads and the coils 2 as well are adapted to be spread apart by operation of the slider 6 to interlock and release the elements 3 and coils 2. The neck portions 11 are preferably rounded as shown, or at any rate do not have a wide extent of engagement with the coils 2, and the latter therefore have a tilting or rocking action on the necks 11, when the fastener is bent laterally, as in the case of an overshoe in the act of walking, and thus permit freedom of lateral bending without the cramping of the elements which occurs where there is a comparatively wide extent of engagement between the interlocked elements.

Moreover, in view of the rocking action of the coils 2 against the necks 11 and the absence of a cramping action between the elements, the side portions of the coils at the outer side of the bend are not sprung apart to the extent that they would be if the convolutions 2 were in engagement with wide fastener elements, and thus, lateral slipping of the headed portions 12 from between the coils 2 is prevented.

With this construction, therefore, I have not only afforded greater flexibility and avoided cramping action and the resulting strain on the fastening device but I have also provided a fastener in which accidental lateral release by bending the fastening device is avoided.

It is also to be noted that the ball portions or heads 12 of the male elements 3 are in substantial alignment and disposed with respect to one another in such manner that when the strip upon which they are mounted lies in a straight line, the balls either touch or are so close together that it is impossible to displace any ball longitudinally of the seam a distance sufficient to permit the escape of one of the opposed locking elements 2 from between said ball and an adjacent ball when the seam is closed. If the ball or male fastener elements, as they may be generically termed, are disposed in contact, no play whatever is permitted between them except when forcibly separated to permit the engagement of the female elements 2 between them. This touching arrangement of the male fasteners is not essential as the advantages of the present invention are realized by any disposition of the fastener elements in a given row which will insure the contact toward the free ends of adjacent elements in the said row before an element is moved longitudinally of the seam a distance sufficient to permit the escape of a cooperating element of the opposite row.

While I have shown and described my invention in a preferred form, I am aware that various changes and modifications may be made without depriving from the principles of my invention the scope of which is to be determined by the appended claims.

I claim as my invention:

1. In a fastening device of the class described, the combination of a series of wire elements, having uniformly spaced arcuate portions, a series of headed members having neck portions adapted to be engaged between the uniformly spaced arcuate portions of adjoining elements, and a slider for interlocking and releasing same, said arcuate portions of the first mentioned series of elements being arranged transversely to the longitudinal axis of the series of elements and adapted to be inserted by the slider between the necks of adjoining elements of the second mentioned series.

2. In a fastening device of the class described, the combination of two separable parts, each having a series of fasteners on the edge thereof, one series of said fasteners comprising convolutions of a coiled member, and the other series comprising headed elements having rounded neck portions which are adapted to be engaged between the outer portions of adjoining convolutions of the coiled member, and a slider for interlocking and releasing the fasteners.

3. In a fastening device of the class described, the combination of opposed series of fastener elements and a slider operable therealong for interlocking the elements of one series between the elements of the other series, the interlocking portions of the elements of one series being disposed so close together that one element in the series will engage an adjacent element in the said series before it has swung longitudinally of the fastening device and thus separated itself from the other adjacent element in said series a sufficient distance to permit the escape or withdrawal of an element of the opposed series from between said two last mentioned elements.

4. In a fastening device of the class described, the combination of a series of male fastener elements, a series of female fastener elements, means upon which the elements are mounted, and a slider operable along the two series of elements for interlocking same, the female elements having openings therethrough and the male elements having headed portions engaging in the openings of the female elements, and the headed portions of the male elements being disposed so close together that one of said male elements will engage an adjacent male element before said male element can be swung longitudinally of the fastening device a sufficient distance to permit the escape or withdrawal of a female element engaged between said first mentioned male element and another male element adjacent thereto.

5. A seam-fastening device comprising a series of fastener elements attached to one edge of the seam, a series of fastener elements attached to the other edge of the seam and adapted to interlock with said first-mentioned series, the free ends of the fastener elements in one of said series being disposed so close together that one element in the series will engage an adjacent element in the said series before it has swung longitudinally of the seam and thus separated itself from the other adjacent element in the said series a sufficient distance to permit the escape or withdrawal of an element of the opposite series from between said two last-mentioned elements, and an actuating slide adapted when moved in one direction to interlock said opposite series of fastener elements, and upon the reverse movement to separate them.

6. A seam fastening device comprising a series of male fastener elements attached to one edge of the seam, a series of female fastener elements attached to the other edge of the seam and adapted to interlock with said first-mentioned series, the male fastener elements toward their free ends being disposed so close together that one of said male elements will engage an adjacent male element before the free end of the first-mentioned male element can be swung longitudinally of the seam a sufficient distance to permit the escape or withdrawal of a female fastener element engaged between said first-mentioned male element and another male element adjacent thereto.

7. A seam fastening device comprising a series of male fasteners attached to one edge of the seam, the locking portions of said fasteners being disposed so as to have mutual points of contact when the seam edge lies in a straight line, and a series of female fasteners attached to the opposite edge of said seam, the locking portions thereof being adapted to surround the said contacting portions of the male fasteners.

8. A seam fastening device comprising a series of male fastener elements attached to one edge of the seam, a series of female fastener elements co-operating therewith and attached to the other edge of the seam, said male elements being disposed so as to provide toward their free ends direct mutual support one for another when the seam edge lies in a straight line and regardless of the presence of a female element between them, whereby the effective longitudinal alignment of the said male elements is preserved.

9. The seam fastening device according to claim 8, further characterized in that an actuating slide is provided to interlock said elements, and the said mutually supporting male elements being so formed as to provide smooth guiding surfaces which lead the female elements into locking position therebetween even though said female elements are initially out of proper alignment.

GEORGE W. BLAIR.